May 2, 1967 W. H. BUELOW ETAL 3,317,193
RETRACTABLE MOTOR VEHICLE TRAILER
Filed Feb. 28, 1966 6 Sheets-Sheet 1

United States Patent Office 3,317,193
Patented May 2, 1967

3,317,193
RETRACTABLE MOTOR VEHICLE TRAILER
William H. Buelow, Brookfield, and George Mihulowicz, Greendale, Wis., assignors to Rex Chainbelt Inc., Milwaukee, Wis., a corporation of Wisconsin
Filed Feb. 28, 1966, Ser. No. 530,471
15 Claims. (Cl. 259—161)

This invention relates to a motor vehicle trailer of the type attached to a truck and arrange for movement between an out-of-use position and an in-use position where it is operable selectively to distribute the gross weight of the vehicle among the individual axles of the truck-trailer assembly in a desired manner. More particularly, the invention relates to an improved trailer of this type which is readily attachable to a conventional truck frame, as, for example, that of a conventional transit mixer truck, and which, in this specific application, does not in any way impair either loading of the mixer or discharge of its contents.

The trailer of the invention finds useful application in conjunction with any truck adapted to carry a load having a high weight per unit volume. This is especially true where the load varies, or in other words, where the truck at different periods carries no load or loads ranging from light to very heavy.

A particularly useful application, as suggested above, is in conjunction with a transit mixer truck. Such trucks and, in particular, those of large capacity, often may not be fully loaded, because to do so would result in such excessive forces being exerted by each wheel or pair of wheels on the underlying roadway as to violate public highway weight regulations. In this connection, it is observed that it is not only gross weight, but the portion borne by each axle and the spacing between axles that are significant in assessing potential road damage.

In view of the particularly useful application to such devices, the trailer of the invention has been illustrated and described as especially adapted for use in conjunction with a transit mixer truck. However, it will, of course, be understood to have broader application.

A highly desirable attribute of the trailer of the present type when used on a transit mixer is that it be constructed so that loading and unloading of the mixer drum can be conveniently carried out when the trailer is in either of its operational positions (in-use or out-of-use). Experience has shown that frequently it is desirable to load when the trailer is in one position and discharge when it is in the other. By the same token, it is often desirable to alter the mode of operation from one job to the next, so that, by way of example, on one job loading and discharge are carried out with the trailer in the in-use position and on the next job these same operations are carried out with the trailer in the out-of-use position.

Devices available for use on transit mixer trucks for distributing load have been subject to numerous deficiencies. Many have not permitted the desired flexibility of operation of the truck, particularly with respect to loading and discharge. Others have not been capable of distributing load to the desired extent. Extensive modifications of the truck frame were required in the case of still others in order to enable them to be installed, the resulting installation then being essentially permanent. These various deficiencies, among others, have resulted in the relatively restricted use of such load-distributing devices.

With the foregoing in mind, it is a primary object of the invention to provide an improved motor vehicle trailer selectively movable between an out-of-use position and an in-use position where it is operable to distribute the gross weight between individual axles of a vehicle and trailer in the desired manner, such trailer overcoming the deficiencies of devices heretofore available for this purpose.

A more specific object is to provide a trailer of the type described especially adapted for use in conjunction with a transit mixer and, when so adapted, operable in such a manner that loading of the mixer and discharge therefrom may both be carried out with the trailer either in its in-use or out-of-use position.

Another object is to provide an improved trailer of the type described, which may be readily attached to and detached from a truck frame without any appreciable modification or redesign of the latter.

It is still another object of the invention to provide an improved trailer of the type described for load-distribution purposes, further characterized in the trailer including power lifting and lowering means that may be quickly and easily installed as an accessory unit on a conventional rear-discharge transit mixer vehicle.

Still another object is to provide a trailer of the type described which is strong and durable and effective in carrying out its intended function, yet which is relatively simple in construction and reliable in operation.

These and other objects, features and advantages of the invention will be better understood by referring to the following detailed description, taken in conjunction with the accompanying drawings, in which.

Figure 1:
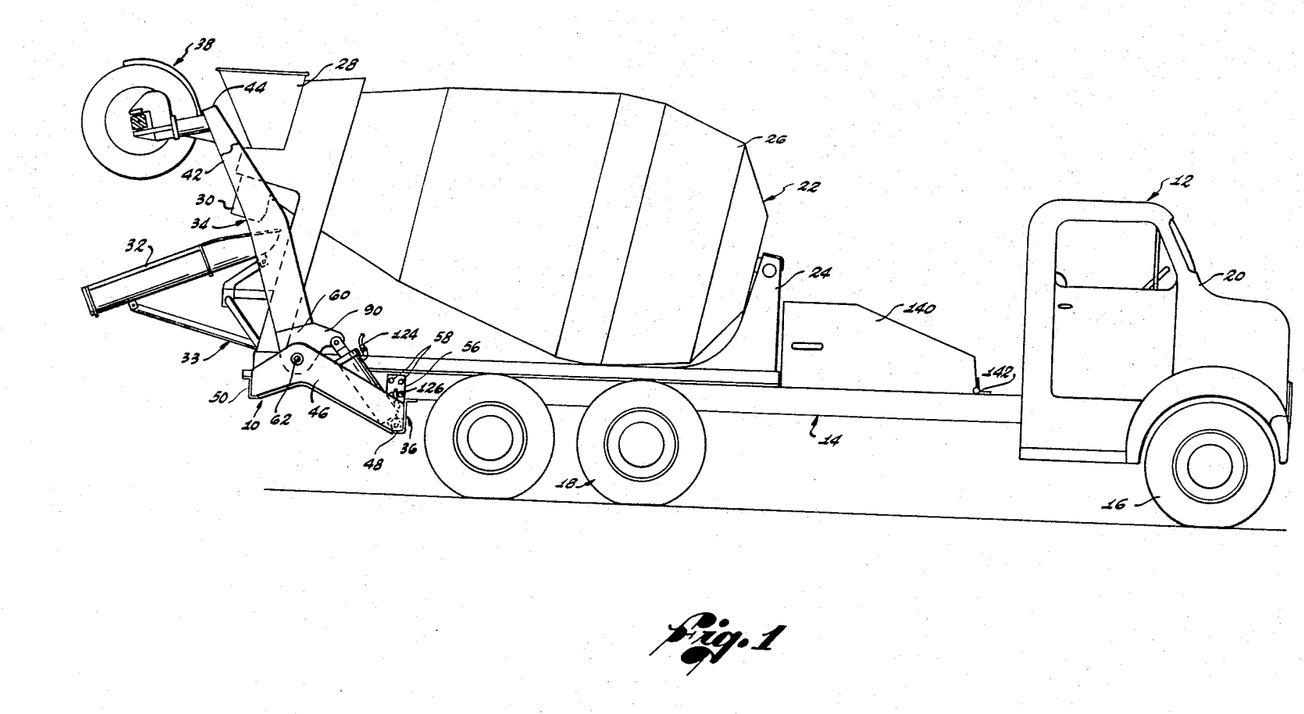
FIGURE 1 is a side elevational view of a trailer constructed in accordance with the invention and attached to a large transit mixer truck, the trailer being shown in an elevated or out-of-use position.
Figure 2:
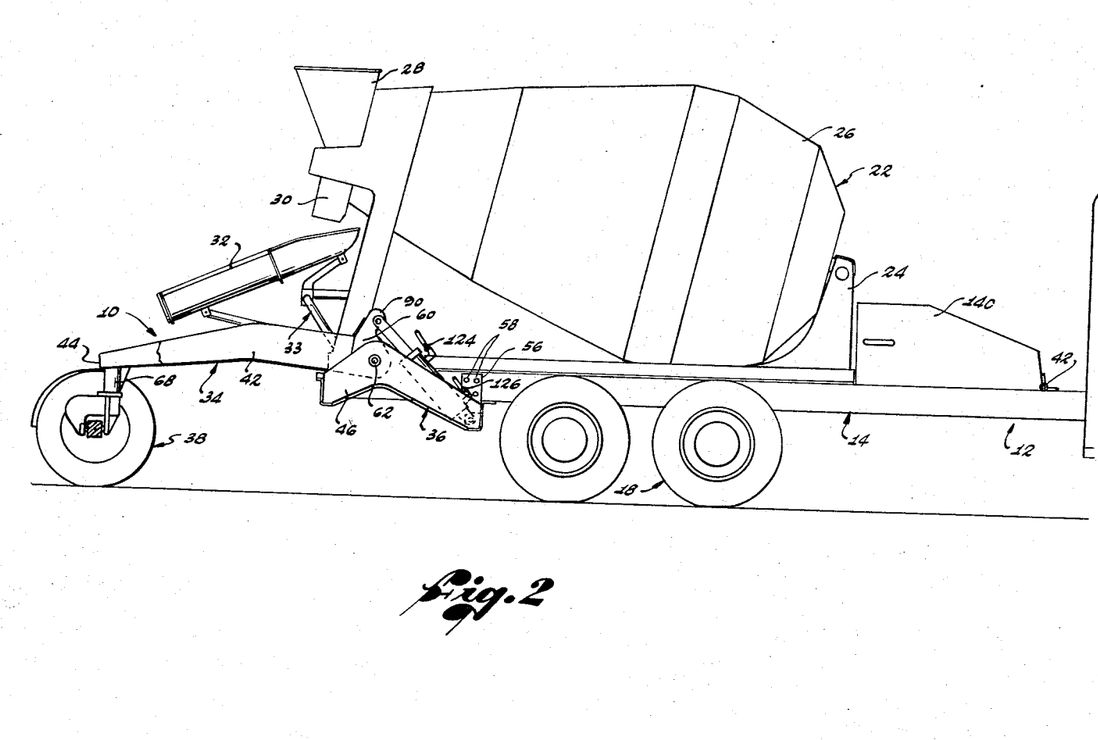
FIGURE 2 is a view similar to FIGURE 1, except that the trailer is shown in a lowered or in-use position.

Referring to the drawings, and in particular to FIGURES 1 and 2, the trailer of the invention, designated by the reference numeral 10, is shown attached to a large transit mixer truck 12 of conventional design. The truck 12 embodies an elongated frame 14 supported adjacent its forward end by an axle-wheel assembly 16 and adjacent its rearward end by an axle-wheel assembly or bogie 18, which is here of the tandem or dual axle type. A portion of the frame 14 projects rearwardly of the rearward extremity of the bogie 18 and serves to mount the trailer 10. A cab 20 is provided on the forward end of the frame 14 and a transit mixer assembly 22 is supported on the frame rearwardly of the cab.

Figure 6:
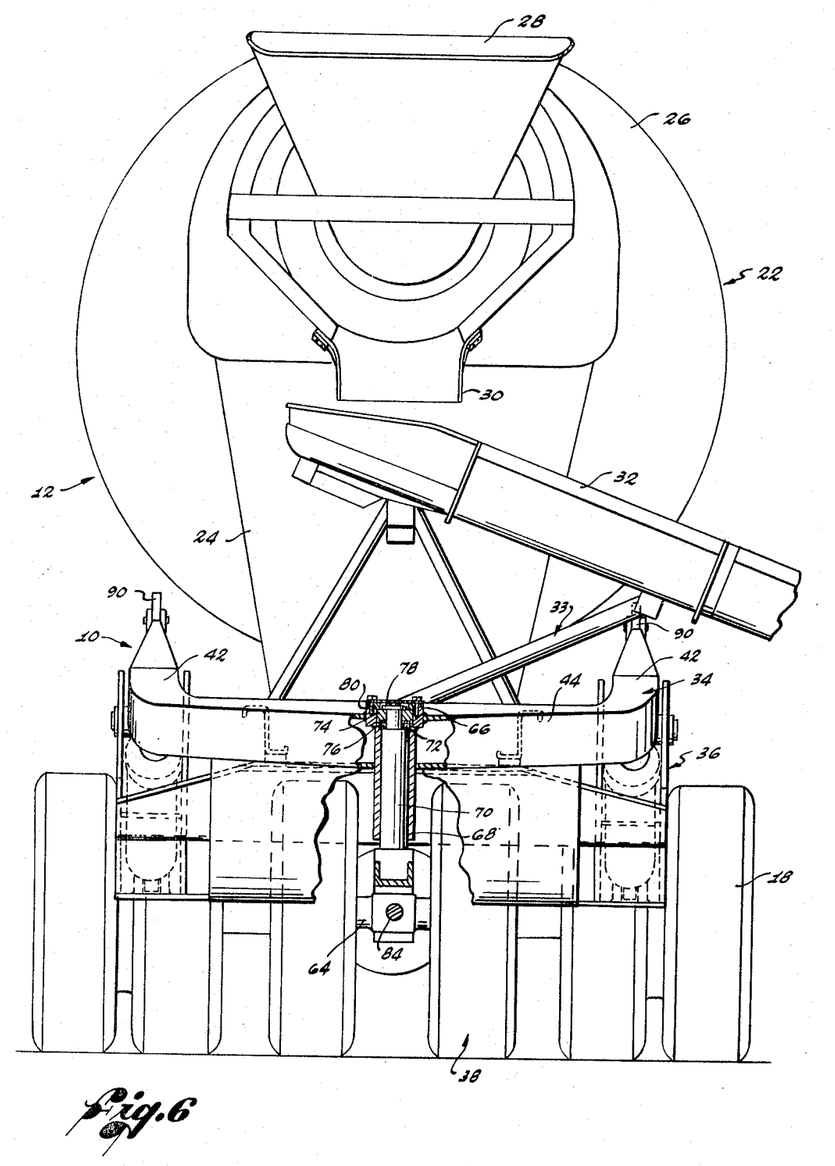
FIGURE 6 is a rear elevational view of the truck mounting the trailer of the invention in its in-use position, as in FIGURES 2 and 5, certain parts of the trailer being broken away and removed in order to show underlying parts in vertical section.

As may be seen in FIGURES 1, 2 and 6, the mixer assembly 22 has a sub-frame 24 secured to the truck frame 14 and rotatably mounts a rearwardly opening drum 26. The drum is arranged for rotation about a longitudinally extending axis that inclines upwardly from front to rear. Also supported on the sub-frame 24 of the mixer assembly in operative relation to the rearward opening (not shown) in the drum 26 is a loading hopper 28 and a discharge spout 30. Positioned below the spout 30 for receiving mix discharged therefrom is an extensible-retractable discharge chute 32. The chute 32 is supported on the subframe 24 by a linkage assembly 33 and arranged for up and down lateral swinging movement in order that the contents of the drum 26 may be discharged at the desired location. The chute 32 is shown retracted and longitudinally aligned with the truck frame 14 in FIGURES 1 and 2, as is usually the case during periods of travel to and from the job site. On the other hand, in FIGURE 6, the chute 32 is extended and swung to the side for discharging the contents of the drum 26.

Referring again to FIGURE 1, in the case of the illustrative truck 12, as is generally the case, the positioning of the mixer assembly 22 on the truck frame 14 is such that its gross weight, including that of its contents, is borne almost entirely by the bogie 18. The result is that with a large capacity drum 26, like the one illustrated, the drum cannot be fully loaded without exceeding weight regulations applicable to the vehicle when traveling on public highways. The trailer 10 is provided for the purpose of distributing a portion of the load otherwise carried by the bogie 18 to other axle-wheel assemblies and thereby enabling full use to be made of the capacity of drum 26.

Figure 5:
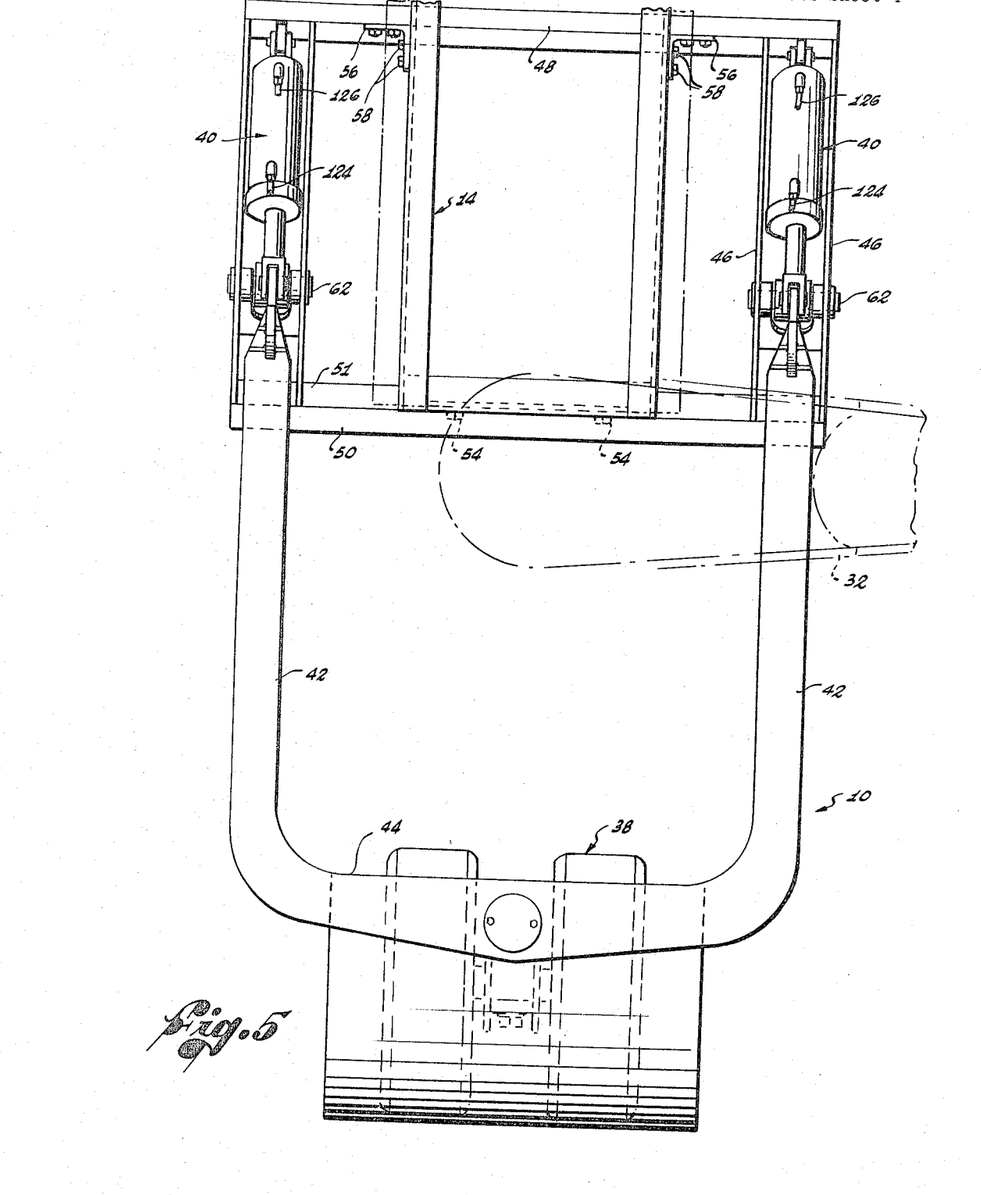
FIGURE 5 is a plan view of the trailer on an enlarged scale in an in-use position, as in FIGURE 2, and with certain parts of the truck being shown in the positions occupied during discharge from the mixer.

In order to achieve this desired result, the trailer 10 is provided with a generally U-shaped chassis 34 (FIGURE 5) comprising a pair of side arms 42 having free ends and interconnected at their opposite ends by a cross-member 44. The chassis is hingedly connected at the free ends of the arms 42 to an auxiliary frame 36, which, in turn, is secured to the rearward end portion of the truck frame 14 and arranged for up and down swinging movement of the chassis about a horizontal axis transverse to the truck frame 14. Movement of the chassis 34 is, as is illustrated in FIGURES 1 and 2, between an elevated position adjacent the rearward end of the mixer assembly 22, and a lowered position wherein it extends generally horizontally and rearwardly. Carried on the outer or closed end of the chassis 34 on the cross-member 44 thereof is an auxiliary or "tag wheel" assembly 38 adapted to engage the ground when the chassis 34 is swung down, as in FIGURE 2.

Power operated means, including a pair of hydraulic cylinder-piston actuators 40, are provided for swinging the chassis 34 between its elevated and lowered positions, corresponding to the out-of-use and in-use positions of the trailer. Such means also serve to urge the chassis 34 forcefully downwardly when the trailer is in use to effect the desired weight distribution.

It will be appreciated that when the actuators 40 are energized to urge the chassis 34 downwardly with the trailer in its in-use position, the effect is to transfer weight from the bogie 18 to the tag wheel assembly 38. The assembly 38 is then spaced to the rear of the bogie 18 a distance or moment arm which, preferably, is one-half or more the spacing between the bogie and the front axle-wheel assembly 16 and, in the illustrative embodiment is on the same order as such spacing. Because of this substantial moment arm, a substantial portion of the weight initially supported by the bogie is also transferred to the front axle-wheel assembly 16. By appropriate adjustment of the force exerted by the actuators 40 the desired distribution of load among the front axle-wheel assembly 16, bogie, and tag wheel assembly 38 can be achieved.

A substantial spacing between the bogie 18 and tag-wheel assembly 38 of the trailer not only is desirable in order to transfer a substantial portion of the gross weight to the front axle-wheel assembly 16, but for another reason as well. As set forth above, having substantial spacing between axles, in addition to limiting per axle load, aids in complying with vehicular weight regulations.

By virtue of the U-shaped configuration of the chassis 34 and the manner in which the assembly 38 is supported thereon, both the chassis and the assembly 38 clear the discharge chute 32 as the former is swung between its two positions. Moreover, when the chassis is in its elevated position of FIGURE 1, the chute 32 extends through it and is free for lateral swinging to any desired position for discharging the contents of the drum 26. On the other hand, when the chassis 34 is in its lowered position of FIGURE 2, the chute 32 is disposed above the chasiss and has like freedom of movement.

Thus, it will be appreciated that discharge from the drum 26 of the mixer assembly 22 may be carried out conveniently with the trailer either in use or out of use. Likewise, the loading hopper 28 is clear for receiving the ingredients to be introduced to the drum when the trailer is in either position and even when it is moving therebetween. Furthermore, when the trailer is in an out-of-use position, essentially the entire structure, including the axle-wheel assembly 38, is to the rear and below the top of the drum 26, so as to minimize wind resistance during periods of highway travel. Accordingly, the present trailer 10 in no way impairs operation of the truck mounting the mixer assembly 22.

Figure 4:
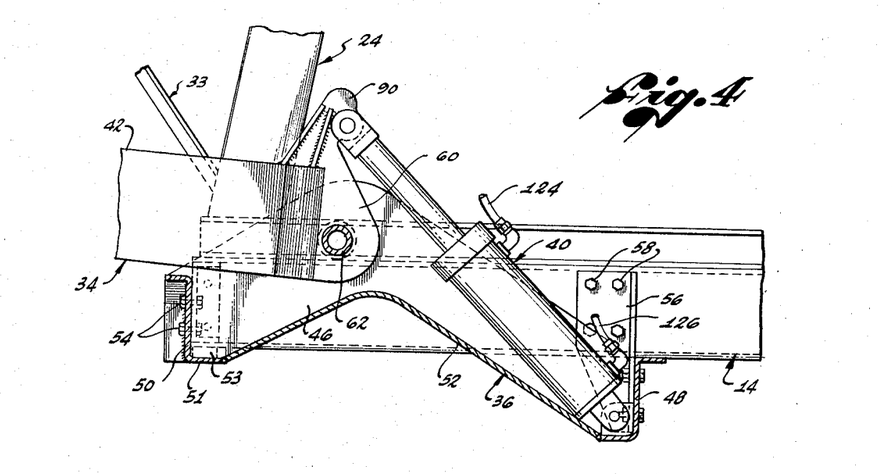
FIGURE 4 is a fragmentary sectional view on an enlarged scale taken along the line 4—4 in FIGURE 3 and showing the trailer attached to the truck frame, as in FIGURE 2.

Turning now to the construction details of the trailer, the auxiliary frame 36 may be seen to comprise a box-like structure with side plate assemblies, each including a pair of laterally spaced plates 46, and front and rear cross-members 48 and 50. Each of the plates 46 has a generally inverted V-shape and, preferably, in order to enhance the strength of the assembly, the plates are joined together by a bottom plate 52 (FIGURE 4). The cross-members 48 and 50 are of a length sufficient to space the plate assemblies apart a distance corresponding to the spacing of the arms 42 of the chassis. As may be seen in FIGURES 5 and 6, such spacing is greater than the width of the truck frame 14, so that when the trailer is installed, the side plate assemblies are disposed on opposite sides of the frame.

In the illustrative embodiment, the auxiliary frame 36 is detachably secured to the truck frame 14, so that the trailer can be installed and subsequently removed in the event it is not needed. Installation is quickly and easily carried out by positioning the forward cross-member 48 beneath the truck frame 14 just to the rear of the bogie 18 and abutting the rear cross-member 50 against the rearward end of the frame. For the purpose of distributing loads applied in an upward direction to the frame end, the cross-member 50 preferably is formed with a forwardly projecting flange 51 that is positioned just beneath the truck frame 14. In some instances, as illustrated in FIGURE 4, it is desirable to provide an appropriately shaped spacer block 53 between the engaging surfaces of the truck frame 14 and flange 51 in order to insure good contact.

Once the auxiliary frame 36 is properly positioned relative to the truck frame 14, it is secured to the latter. This may be accomplished by bolting the cross-member 50 to the frame 14, as at 54 in FIGURES 4 and 5. In the case of forward cross-member 48, L-shaped brackets 56 are provided on it at appropriate positions and arranged to engage the sides of the truck frame 14, as may also be seen in FIGURES 4 and 5. As with the forward cross-member, the brackets may be bolted to the truck frame 14, as at 58.

It will be appreciated that by virtue of the construction of the auxiliary frame 36, installation of the trailer 10 on the truck may be quickly and easily accomplished. Moreover, this may be done without necessity of any appreciable modification of the truck frame. Accordingly, the trailer is adapted for use with standard equipment. By the same token, subsequent removal of the trailer from the truck does not, in any way, adversely affect the truck.

Connection of the free ends of the arms 42 of the chassis 34 to the auxiliary frame 36 is at a location adjacent the apexes of the side plates 46 of the auxiliary frame 36. For mounting purposes, brackets 60 are fixed to the ends of the arms 42 and are receivable between the respective pairs of plates 46. Mounting is accomplished by hinge pin assemblies 62 supported between the plates 46 of each pair in the manner shown in FIGURES 4 and 5. The two pin assemblies 62 are axially aligned with one another and serve to define the aforementioned hinge axis of the chassis 34.

The tag wheel assembly 38 includes a pair of wheels supported on an axle 64 that is relatively short in relation to the axles of the truck. To prevent "scuffing" of the tag wheels when the truck is steered in a curved path, the tag wheel assembly 38 is caster-mounted. This is accomplished by means of a strut assembly illustrated in FIGURE 6. As shown in that figure, such assembly has a mounting collar 66 and sleeve 68 that are secured to and project through the cross-member 44 of the chassis 34. The assembly 38, in turn is provided with a generally vertically oriented shaft 70 that is receivable in bearing engagement in the sleeve 68. In order that the assembly 38 will trail in the desired manner when the truck is moving in a forward direction the shaft 70 is spaced forwardly of the transverse axle 64.

To maintain the assembly 38 connected to the chassis 34, suitable means are provided on the shaft 70 and collar 66. In the instant case, the portion of the shaft 70 disposed within the collar 66 is necked down to provide an upwardly facing shoulder 72. A bushing 74 is disposed within the collar around the necked down portion of the shaft and adjacent the shoulder 72 with a bearing 76 therebetween. A retainer plate 78 secured to the upper end of the shaft 70 prevents the tag wheel assembly 38 from dropping free of the chassis 34. At the upper end of the strut assembly, a retainer ring 80 covered by a closure plate 82 is secured to the collar 66 and prevents the shaft 70 from moving upwardly relative to the sleeve beyond the position shown in FIGURE 6.

Operation of the truck 12 and trailer 10 usually involves driving over uneven terrain as well as highway travel. To avoid an undue portion of the load being applied temporarily to a given wheel of the assembly 38, its transverse axle 64 is arranged for limited rocking motion about a longitudinal axis. A pivot pin 84, illustrated in FIGURE 6, provides for such rocking. Therefore, it will be appreciated that the wheel assembly 38 is free to caster about a vertical axis defined by the shaft 70 and also for limited rocking motion about a horizontal axis defined by the pin 84. Preferably, the assembly 38 is equipped with a mud flap 86 and suitable brakes (not shown).

Figure 3:
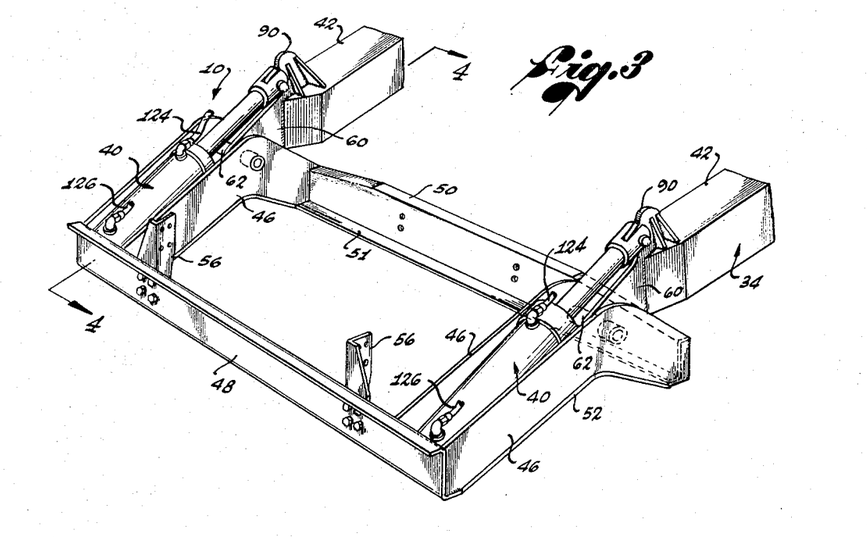
FIGURE 3 is a perspective view showing the portion of the trailer adapted to be secured to the truck frame.

As set forth above, the chassis 34 is raised and lowered and forcefully urged downwardly when the tag wheel assembly 38 engages the ground by the actuators 40. The actuators are double acting or, in other words, may be both extended and retracted under power. Each actuator 40 is, for protective purposes, located between associated side plates 46 of the auxiliary frame 36 and is pivotally connected at its respective ends to the chassis 34 and auxiliary frame, as illustrated in FIGURES 3 and 4. Connection to the auxiliary frame 36 is at a location adjacent the forward cross-member 48 and is accomplished by any suitable means. At the opposite end of each actuator, connection is made to an upstanding lever arm 90 formed on the mounting bracket 60 of each of the arms 42 of the chassis.

With this pivotal mounting arrangement, it will be understood that as pressurized hydraulic fluid is applied to the actuators 40 in such a manner as to extend them toward the condition shown in FIGURES 2, 3 and 4, the chassis 34 is swung down to its lowered position. Once the tag wheel assembly 38 engages the ground surface, further application of pressurized fluid relieves some of the load from the bogie 18 and distributes it between the tag wheel assembly 38 and front axle-wheel assembly 16 of the truck in the manner previously described. The extent of the distribution is, of course, controlled by the fluid pressure applied to the actuators 40. Conversely, application of fluid to the actuators 40 in such a manner as to retract them, swings the chassis 34 upwardly toward its elevated position.

Figure 7:
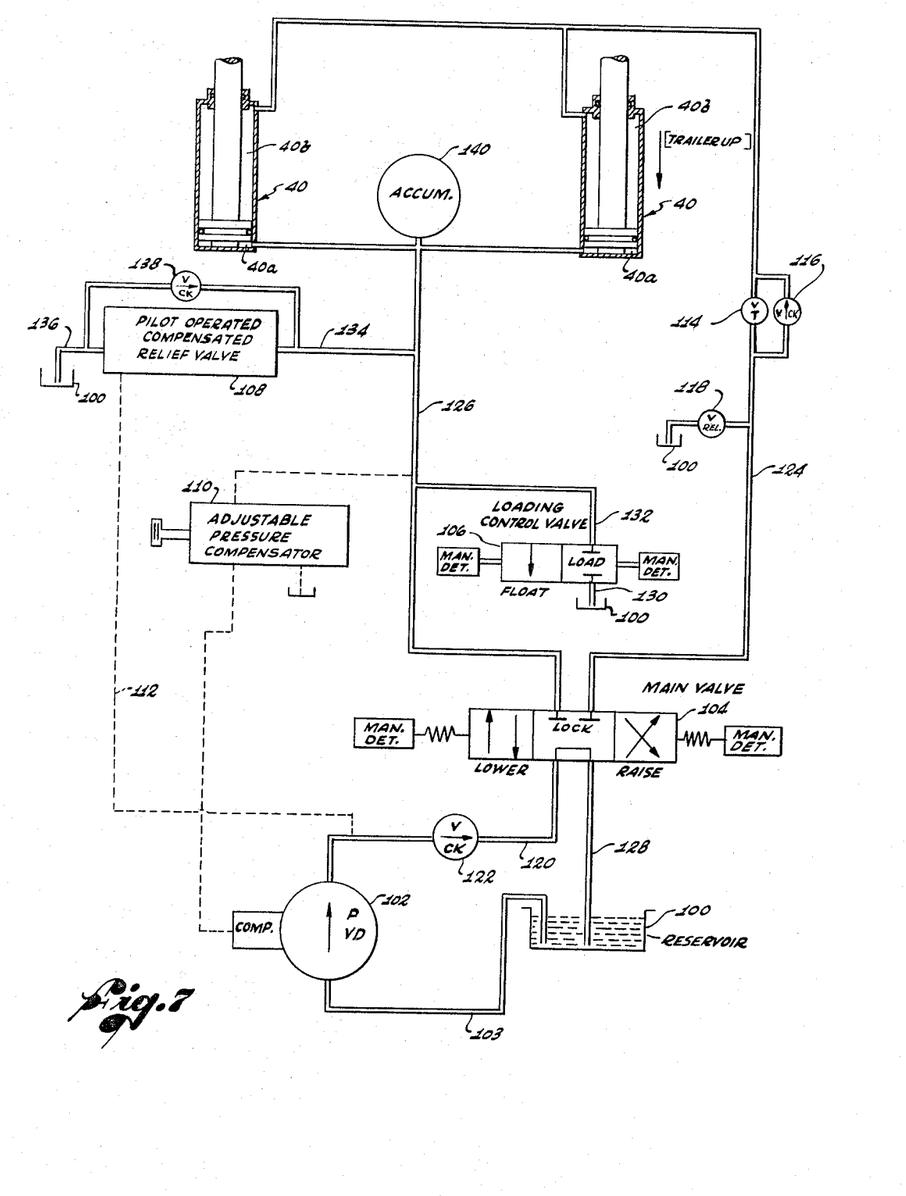
FIGURE 7 is a schematic diagram of a suitable hydraulic system for operating the trailer.

A hyddaulic system suitable for powering the actuators 40 is shown schematically in FIGURE 7. Pressurized fluid is supplied alternately to either the head ends 40a of the actuators to extend them, or to the rod ends 40b to retract them, by a pressure-compensated, variable-displacement pump 102 connected by a supply conduit 103 to the reservoir 100. Flow to and from the actuators 40 is controlled by means including a manually operable main valve 104, a manually operable loading control valve 106, a pilot operated relief valve 108 and an adjustable pressure-responsive compensator 110 controlling the pump flow.

Before considering in detail the operation of the hydraulic system and components, the general functions and purposes of the principal components are described as follows.

Lowering, raising or locking of the tag wheel assembly 38 is selectively accomplished by manipulating the main valve 104 to one of its three positions so identified in FIGURE 7.

The application of downward force, i.e., "loading" of the tag wheel assembly 38 when it is in a lowered position, is accomplished by closing of the loading control valve 106, while leaving the main valve in its "lower" position.

The tag wheel assembly 38 may be placed in "float" condition, i.e., one in which no hydraulic forces are exerted thereon either upwardly or downwardly, by opening the control valve 106.

Adjustment and limitation of the amount of "loading" applied to the tag wheel assembly 38 is accomplished by means of the pressure compensator 110. This unit is part of a conventional pressure compensated, variable volume pump system which operates in response to system pressure to reduce the discharge volume of the pump 102 to substantially zero (leakage make-up only) when the system pressure reaches a desired level. Thus, the amount of "loading" to be applied to the tag wheel assembly 38 may be adjusted by setting the compensator 110 to cut off the pump flow at an appropriate system pressure.

The function of the pilot operated relief valve 108 is to relieve excess system pressure and thus maintain uniform loading on the tag wheels of the assembly 38 when the same pass over a major road obstruction or "bump." Such pressure relief is accomplished by draining fluid from a portion of the system to the reservoir 100 whenever the pressure exceeds by a given margin the "loading" value set by the compensator 110. For this purpose, a pilot pressure-sensing connection 112 is provided between the pump discharge and the relief valve 108.

Yielding resistance to lowering of the trailer is desirable so that the chassis 34 will not drop suddenly by its own weight from an elevated position. Such resistance is provided hereby a flow restrictor 114 which is effectively connected to restrict discharge from the actuators 40 during "lowering," but is by-passed through a check valve 116 during "raising."

In order to prevent damage to the hydraulic system when the trailer 10 reaches the mechanical limit of its upward swing, a relief valve 118 is provided. This relief valve 118 is set to release fluid to the reservoir 100 when the system pressure rises to slightly above the highest pressure in the system required for raising.

With the foregoing functions of the components in mind, the operation of the system will now be described.

OPERATION

*Raising of the trailer*

With the main valve 104 in "raise" position, it will be seen that pressurized fluid is delivered from the pump 102 through a conduit 120, check valve 122, the main valve 104, a conduit 124, and the check valve 116, to the rod ends 40b of the actuators 40. This, it will be seen, retracts the rods of the actuators and raises the chassis 34, as previously described.

During the raising stroke of the actuators 40, the fluid discharged at the head ends 40a thereof returns through a conduit 126, the main valve 104 and a conduit 128 to the reservoir 100. When the actuators reach the mechanical limit of the raising stroke, as, for example, by the pistons impinging against the cylinder heads, the resulting increase in system pressure opens the relief valve 118 and temporarily releases fluid to the reservoir 100 until the main valve can be moved to "lock" position, thus trapping fluid in the actuators 40 and locking the trailer in its out-of-use position.

Lock position

When the main valve 104 is in "lock" position, the pump 102 is relieved of the fluid pressure load and fluid freely circulates through the conduit 120, the valve 104, and the conduit 128 back to the reservoir 100.

Lowering of the trailer

The chassis 34 may be lowered whether or not the pump 102 is operating. When the main valve 104 is moved to "lower" position, the fluid previously trapped in the actuators 40 is released, being expelled by the weight of the chassis and through the conduit 124, including the flow restrictor 114, the valve 104 and the conduit 128, back to the reservoir 100.

During the lowering cycle, movement of the pistons in the actuators 40 tends to draw a vacuum at the head ends 40a. If the pump 102 is not operating, oil will be drawn from reservoir 100 through check value 138 which is connected between conduits 134 and 136. Also, the loading control valve 106 should be placed in "float" position and will similarly permit fluid to be drawn freely through that valve from the reservoir 100 through conduits 130 and 132 into the actuators, thereby preventing cavitation in the pump.

If the pump is in operation during lowering, it will, of course, supply fluid to the head ends 40a of the actuators 40 and there will be no vacuum.

The flow restriction of the restrictor 122 is such as to control the rate of descent of the chassis during lowering and thus obviate the danger of damage or injury due to a sudden drop.

"Loading" of the trailer

In order to exert a downward force by the actuators 40 and thus load the trailer 10, the main valve is left in "lower" position, the loading control valve 106 is placed in "load" position, the compensator 110 is adjusted to the desired loading value, and the pump 102 is placed in operation. Fluid is then delivered through the conduit 120, the valve 104, and the conduit 126 to the head ends of the actuators 40, loading the trailer. When the pressure in the conduit 126 builds up to a value corresponding to the desired loading, the compensator 110 automatically operates to reduce the pump discharge volume to substantially zero, the flow being only that required to make up for leakage and maintain the desired loading pressure.

As previously explained, the pilot operated relief valve 108 operates during the loaded condition to release fluid through conduits 134 and 136 back to the reservoir whenever the pressure differential between the pump discharge and the conduit 126 exceeds a given value. In this connection, it should be noted that the check valve 122 is located in the pump discharge conduit 120 downstream of the coupling of the sensing conduit 112 to prevent excess system pressures occasioned by mechanical shock or momentary overload from reacting on the output pressure of pump 102 and transmitting to pilot operated relief valve 108 a pressure which is the overload pressure rather than the pump output pressure.

Installed in the conduit 126 adjacent the head ends 40a of the actuators 40 is an accumulator 140 of conventional design. It functions to provide additional "cushioning" for the system and to minimize minor changes of pressure in this portion of the system resulting from changes in load on the actuators 40.

The controls for at least the manually operable valves 104 and 106 preferably are located in the cab 20 of the truck 10 in order that they may be conveniently manipulated by the operator from that location to operate the trailer. As noted above, the "lock" position of the main valve 104 is its normal position, and, preferably, it is spring-biased toward that position. In the illustrative case, the "lower" position is self-maintaining, so that once the valve is actuated to that position, it will remain there until released. On the other hand, the main valve 104 is arranged, so that it must be hand-held in its "raise" position.

The various elements of the hydraulic system for powering the actuators 40 are mounted at any suitable location. In the present case they are mounted on the truck frame 14 just ahead of the mixer assembly 22 within a protective housing 140, illustrated in FIGURES 1 and 2.

When the trailer 10 is raised to its out-of-use position preparatory to the truck going out on a job, loading of the drum 26 may be carried out in the usual manner. As is apparent in FIGURE 1, the hopper 28 is free to receive material for loading into the drum 26.

In the normal operational sequence, the trailer 10 would be lowered to its in-use position to distribute the load before proceeding to the job site. This may be quickly and easily accomplished as previously described.

When the truck 12 reaches the job site, discharge of the contents of the drum 26 may be accomplished with the trailer 10 still in the in-use position. The discharge chute 42 is swung laterally and up and down to position it as desired without interference from the trailer. Should such discharge be carried out with the trailer still in its load-distribution mode of operation, it may be necessary to adjust the compensator 110 from time to time as the load decreases in order to maintain an adequate traction load on the bogie 18. Alternately, the system can be switched to the flotation mode of operation described above by simply actuating the valve 106 to "float" position.

On the other hand, conditions at the job site may render it desirable to have the trailer in an out-of-use position during discharge. In such cases, the chute 32 may, as shown in FIGURE 1, be extended through the U-shaped chassis 34, as previously described. Whatever the position of the trailer during discharge of the drum load, raising of the trailer to its out-of-use position normally would be accomplished before the truck returns from the job site.

While one embodiment of the invention has been illustrated and described in considerable detail, it will be understood that this was only by way of example and that various changes in the details of the constructions and arrangements of the various parts may be made without departing from the spirit and scope of the invention.

We claim:

1. In combination with a transit mixer truck having an elongated main frame with forward and rearward ends and mounting on said main frame adjacent the rearward end thereof a mixer assembly including a rotatable drum with a rear loading-discharge opening, a loading hopper and a discharge spout in operative association with said opening, and an extensible-retractable discharge chute below said spout and arranged for swinging movement relative to said main frame, a trailer comprising:

an auxiliary frame secured to the main frame adjacent the rearward end thereof;

a generally U-shaped chassis including a pair of laterally spaced side assemblies hingedly connected at their free ends to said auxiliary frame, said chassis being arranged for swinging movement about an axis oriented generally horizontally and perpendicular to the longitudinal axis of the main frame between an elevated position proximate the end of the mixer assembly and a lowered generally horizontal position, there being a central open space in said chassis through which the discharge chute passes as said chassis is swung between its elevated and lowered positions;

a tag wheel assembly supported on the outer end of said chassis at a location substantially midway between its side assemblies and arranged to engage the ground surface when said chassis is in its lowered position;

and power operated means for swinging said chassis between its elevated and lowered positions and forcefully urging said chassis downwardly when in its lowered position.

2. The subject matter of claim 1, wherein said auxiliary frame is detachably secured to the main frame.

3. The subject matter of claim 1, wherein said side assemblies of said chassis are of lengths whereby the outer end of said chassis and said axle-wheel assembly supported thereon move in arcs spaced rearwardly of the main frame a distance greater than the distance which the discharge chute projects beyond the rearward end of the main frame when in its retracted condition and longitudinally aligned with the main frame.

4. The subject matter of claim 1, wherein said auxiliary frame comprises a rectangular structure having forward and rearward cross-members, at least said forward cross-member engaging the underside of the main frame and said rearward cross-member engaging the rearward end of the main frame.

5. The subject matter of claim 1, wherein said auxiliary frame includes a pair of side plate assemblies arranged generally longitudinally of the main frame on opposite sides thereof, each of said side plate assemblies comprising a pair of laterally spaced plates, and wherein said power operated means includes a pair of double-acting, cylinder-piston actuators disposed, one each, between the associated plates of each of said side plate assemblies.

6. The subject matter of claim 5, wherein said side assemblies are provided adjacent their free ends with lever arms, and wherein said actuators are pivotally connected at their opposite ends to the upper ends of said arms and to said auxiliary frame.

7. The subject matter of claim 1, wherein said tag wheel assembly is caster-mounted and arranged for limited pivoting about a horizontal axis oriented longitudinally of the main frame.

8. In combination with a transit mixer truck having an elongated main frame with forward and rearward ends and supported adjacent its respective ends on front and rear axle-wheel assemblies, said main frame mounting adjacent its mixer assembly including a rotatable drum with a rear loading-discharge opening, a loading hopper and a disdcharge spout in operative association with said opening, and an extensible-retractable discharge chute below said spout and arranged for swinging movement relative to said main frame, a trailer on said truck and relatively movable between in-use and out-of-use positions, comprising:

an auxiliary frame secured to the main frame adjacent the rearward end thereof;

a chassis mounted on said auxiliary frame and movable relative thereto between elevated and lowered positions corresponding to the out-of-use and in-use positions, respectively, of the trailer, there being a central open space in said chassis through which the discharge chute projects as said chassis is moved between its operative positions;

a tag wheel assembly mounted on said chassis and arranged to engage the ground surface when said chassis is in its lowered position at a location spaced rearwardly of the rear axle-wheel assembly a distance equal to at least one-half the distance which said rear axle-wheel assembly is spaced from said front axle-wheel assembly;

and power operated means for moving said chassis between its operative positions and forcefully urging it downwardly when said tag wheel assembly engages the ground surface.

9. The subject matter of claim 8, wherein said tag wheel assembly is to the rear of the drum with a major portion thereof below the top of the drum and said chassis is proximate the rearward end of the drum when said chassis is in its elevated position.

10. The subject matter of claim 8, wherein said auxiliary frame includes a front cross-member disposed below the main frame just to the rear of the rear axle-wheel assembly and a rear cross-member abutting the rearward end of the main frame.

11. A trailer for use on a truck having an elongated frame supported on longitudinally spaced axle-wheel assemblies, comprising:

a rectangular auxiliary frame adapted to be secured to the main frame adjacent one end of the latter, said auxiliary frame when secured to the main frame being located toward said one end from the adjacent axle-wheel assembly;

a chassis including a pair of laterally spaced side arm assemblies pivotally connected at one of their ends to said auxiliary frame and connected to one another at the other of their ends by a cross-member, said chassis being arranged for swinging movement relative to said auxiliary frame between elevated and lowered positions;

an auxiliary wheel assembly supported on said cross-member at a location substantially midway between said side arm assemblies and arranged to engage the ground surface when said chassis is in its lowered position;

and power-operated means connected to said side arm assemblies and to said auxiliary frame for swinging said chassis between its elevated and lowered positions and forcefully urging said chassis downwardly relative to said auxiliary frame when said chassis is in its lowered position.

12. The subject matter of claim 11, wherein said auxiliary frame includes a first cross-member adapted to engage the underside of the truck frame at a location between said one end of the truck frame and the adjacent axle-wheel assembly and a second cross-member adapted to engage the said one end of the truck frame.

13. The subject matter of claim 11, wherein each of said side plate assemblies includes a pair of laterally spaced plates of inverted V-shapes, and wherein said side arm assemblies having their proximal ends disposed between the plates of each such assembly are pivotally connected thereto adjacent the apexes of said plates.

14. The subject matter of claim 11, wherein each of said side arm assemblies are provided adjacent their proximal ends with upwardly extending arms, and wherein said power-operated means includes a pair of double acting, cylinder-piston actuators disposed, one each, between the associated plates of each of said side plate assemblies and pivotally connected at their opposite ends to the upper ends of said lever arms and said auxiliary frame.

15. In combination with a truck having steerable forward and main load supporting rear wheels and spaced parallel frame members projecting rearwardly thereof, a concrete mixer mounted on said frame members over said rear wheels and having a drum with a rear elevated charging and discharge opening and an inclined directional gravity discharge chute extending from beneath said drum opening, said chute having a vertical pivot support beneath the discharge opening of said drum allowing said chute to be extended rearwardly or sidewardly of the mixer;

an auxiliary frame connected to said truck frame members at the rear thereof and having bearing means on each side of the truck frame, a trailer chassis having a forward end at each side thereof pivotally connected to the corresponding bearing means of the auxiliary frame, trailer wheels carried by and beneath the rear of said trailer chassis, and hydraulic means including a pressure cylinder on each side of the truck frame and having one end connected to said auxiliary frame and the other end to the corresponding end of the trailer chassis whereby fluid pressure selectively applied to the opposite ends of the cylinders respectively pivots said trailer chassis upwardly to a raised position or applies a force to the frame in its lower position whereby a predetermined portion of the weight of the truck is carried by the trailer wheels, the center of said chassis being open and unobstructed whereby the chassis in either said upper or lower position presents no obstruction to the use of said discharge chute.

References Cited by the Examiner

UNITED STATES PATENTS

| | | | |
|---|---|---|---|
| 3,112,100 | 11/1963 | Prichard | 259—161 |
| 3,191,961 | 6/1965 | Brennan et al. | 280—81 |
| 3,191,963 | 6/1965 | Prichard | 280—81 |
| 3,240,477 | 3/1966 | Brennan et al. | 259—177 |
| 3,246,884 | 4/1966 | Prichard | 259—61 |

WALTER A. SCHEEL, *Primary Examiner.*

R. W. JENKINS, *Examiner.*